US012614955B2

(12) United States Patent
Yagi et al.

(10) Patent No.: US 12,614,955 B2
(45) Date of Patent: Apr. 28, 2026

(54) ELECTRIC WORK MACHINE

(71) Applicant: MAKITA CORPORATION, Anjo (JP)

(72) Inventors: Tsubasa Yagi, Anjo (JP); Hidekazu Suda, Anjo (JP); Shunpei Yamaji, Anjo (JP)

(73) Assignee: MAKITA CORPORATION, Anjo (JP)

( * ) Notice: Subject to any disclaimer, the term of this patent is extended or adjusted under 35 U.S.C. 154(b) by 406 days.

(21) Appl. No.: 18/267,607

(22) PCT Filed: Dec. 15, 2021

(86) PCT No.: PCT/JP2021/046311
§ 371 (c)(1),
(2) Date: Jun. 15, 2023

(87) PCT Pub. No.: WO2022/131300
PCT Pub. Date: Jun. 23, 2022

(65) Prior Publication Data
US 2024/0055958 A1 Feb. 15, 2024

(30) Foreign Application Priority Data

Dec. 18, 2020 (JP) ................................. 2020-210607

(51) Int. Cl.
*H02K 11/33* (2016.01)
*B25F 5/00* (2006.01)
(52) U.S. Cl.
CPC .............. *H02K 11/33* (2016.01); *B25F 5/008* (2013.01); *H02K 2211/03* (2013.01)

(58) Field of Classification Search
CPC .... H02K 11/30; H02K 11/33; H02K 2211/03; H02K 9/00; H02K 9/02; H02K 9/04;
(Continued)

(56) References Cited

U.S. PATENT DOCUMENTS

2011/0256002 A1* 10/2011 Ikeda .................... F04C 23/008
417/410.1
2013/0108485 A1 5/2013 Suitou et al.
(Continued)

FOREIGN PATENT DOCUMENTS

CN 103089634 A 5/2013
CN 104663010 A 5/2015
(Continued)

OTHER PUBLICATIONS

May 28, 2024 Office Action issued in Japanese Patent Application No. 2020-210607.
(Continued)

*Primary Examiner* — Alexander A Singh
(74) *Attorney, Agent, or Firm* — Oliff PLC

(57) ABSTRACT

An electric work machine includes a motor, a circuit board, a case, at least one elastic member, and a filler. The circuit board includes a heat generating element mounted thereon, and the heat generating element generates heat due to the motor being driven. The case includes a heat dissipation part thermally coupled to the heat generating element and houses the circuit board therein. The at least one elastic member is placed between the circuit board and the case, and is housed inside the case. The filler is filled inside the case and fixes the circuit board and the at least one elastic member inside the case.

17 Claims, 8 Drawing Sheets

(58) Field of Classification Search
CPC ............ H02K 9/06; H02K 9/08; H02K 9/227;
H02K 9/22; B25F 5/02; B25F 5/008
USPC ...................................................... 310/52, 64
See application file for complete search history.

(56) References Cited

U.S. PATENT DOCUMENTS

| | | | |
|---|---|---|---|
| 2013/0108486 A1* | 5/2013 | Suitou | F04B 39/121 |
| | | | 417/410.1 |
| 2015/0216088 A1 | 7/2015 | Kawai et al. | |
| 2016/0020676 A1 | 1/2016 | Omura et al. | |
| 2016/0269067 A1 | 9/2016 | Pidwerbecki et al. | |
| 2018/0080453 A1 | 3/2018 | Yamamoto et al. | |

FOREIGN PATENT DOCUMENTS

| | | |
|---|---|---|
| CN | 204913830 U | 12/2015 |
| CN | 105531639 A | 4/2016 |
| CN | 206559782 U | 10/2017 |
| JP | 2005129820 A | 5/2005 |
| JP | 2016-022543 A | 2/2016 |
| JP | 6491025 B2 | 3/2019 |

OTHER PUBLICATIONS

Apr. 5, 2025 Office Action issued in Chinese Patent Application No. 202180083095.6.

Mar. 1, 2022 International Search Report issued in International Patent Application No. PCT/JP2021/046311.

Jun. 13, 2023 International Preliminary Report on Patentability issued in International Patent Application No. PCT/JP2021/046311.

Jul. 31, 2025 Notice of Reasons for Rejection issued in Chinese Patent Application No. 202180083095.6.

* cited by examiner

FRONT DIRECTION

UPPER DIRECTION

LOWER DIRECTION

REAR DIRECTION

ELECTRIC WORK MACHINE

CROSS-REFERENCE TO RELATED APPLICATION

This international application claims the benefit of Japanese Patent Application No. 2020-210607 filed on Dec. 18, 2020 with the Japan Patent Office, the entire disclosure of which is incorporated herein by reference.

TECHNICAL FIELD

The present disclosure relates to an electric work machine.

BACKGROUND ART

Patent Document 1 discloses an electric work machine in which a fan is rotated by drive of a motor to thereby blow the air out.

PRIOR ART DOCUMENTS

Patent Documents
Patent Document 1: Japanese Patent Publication No. 6491025

SUMMARY OF THE INVENTION

Problems To Be Solved by the Invention

When an electric work machine is driven to perform work, a circuit board that controls drive of a motor may be deformed due to heat generated in electronic components installed thereon. Consequently, there may be a case where heat dissipation performance decreases, which further increases a temperature of the circuit board.

One aspect of the present disclosure prevents a deformation of a circuit board and suppresses a decrease in heat dissipation performance.

Means for Solving the Problems

One aspect of the present disclosure provides an electric work machine including a motor, a circuit board, a case, at least one elastic member, and a filler.

The circuit board includes thereon a heat generating element that generates heat due to the motor being driven. The case includes a heat dissipation part thermally coupled to the heat generating element, and houses the circuit board therein. The at least one elastic member is placed between the circuit board and the case, and is housed inside the case. The filler is filled inside the case and fixes the circuit board and the at least one elastic member inside the case.

In the electric work machine of the present disclosure configured as above, even when the filler is highly heated and expands by the heat generated in the heat generating element, the elastic member placed inside the case deforms earlier than the circuit board, absorbing an expanding force of the filler. As a result, the electric work machine of the present disclosure can reduce a force applied to the circuit board from the expanded filler and thus can suppress a deformation of the circuit board that is caused by the expanded filler. Accordingly, since the deformation of the circuit board is suppressed, the electric work machine of the present disclosure can suppress a resulting decrease in heat dissipation performance provided through thermal coupling between the heat generating element and the thermal coupling part. Moreover, this can suppress further increase in temperature of the circuit board due to the electric work machine being driven.

In the electric work machine, the case may include a bottom and side walls. The bottom faces a back surface of the circuit board. The back surface is one surface of the circuit board. The side walls enclose side edges of the circuit board. The at least one elastic member may be placed so as to fill a gap between the side edges of the circuit board and the side walls of the case.

In the electric work machine, the at least one elastic member may be placed in a vicinity of the heat generating element. This allows the electric work machine of the present disclosure to suppress the deformation of the circuit board in the vicinity of the heat generating element. Accordingly, since the deformation of the circuit board is suppressed, the electric work machine of the present disclosure can suppress the resulting decrease in heat dissipation performance provided through thermal coupling between the heat generating element and the thermal coupling part. Moreover, this can suppress further increase in temperature of the circuit board due to the electric work machine being driven.

In the electric work machine, the circuit board may be formed in a shape of a rectangle, and may include four of the side edges forming the rectangle. The at least one elastic member may include a first elastic member and a second elastic member. The first and second elastic members may be arranged so as to face each other. The heat generating element may be arranged between the first and second elastic members. The first elastic member is placed between a first side edge of the circuit board and a side wall of the case. The second elastic member is placed between a second side edge of the circuit board and a side wall of the case. The first and second side edges are two of the four of the side edges and are opposite to each other.

Consequently, the electric work machine of the present disclosure can suppress the deformation of the circuit board at multiple locations in the vicinity of the heat generating element. Accordingly, since the deformation of the circuit board is suppressed, the electric work machine of the present disclosure can suppress the resulting decrease in heat dissipation performance provided through thermal coupling between the heat generating element and the thermal coupling part. Moreover, this can suppress further increase in temperature of the circuit board due to the electric work machine being driven.

In the electric work machine, the at least one elastic member may be placed closer to the bottom with respect to a top surface of the circuit board. The top surface is one surface opposite the back surface. Thus, in the electric work machine of the present disclosure, expansion of the filler situated between the circuit board and the bottom of the case cannot easily cause the circuit board to deform in a direction away from the thermal coupling part. Since the deformation of the circuit board is suppressed, the electric work machine of the present disclosure can suppress the resulting decrease in heat dissipation performance provided through thermal coupling between the heat generating element and the thermal coupling part. Moreover, this can suppress further increase in temperature of the circuit board due to the electric work machine being driven.

In the electric work machine, the case may include a bottom and side walls. The bottom faces a back surface of the circuit board. The back surface is one surface of the circuit board. The side walls enclose side edges of the circuit board. The at least one elastic member may be placed between the side edges of the circuit board and the side walls of the case. The filler may be filled in at least one of a gap between the at least one elastic member and a side wall of the case or a gap between the at least one elastic member and a side edge of the circuit board.

In the electric work machine, the case may include a bottom and side walls. The bottom faces a back surface of the circuit board. The back surface is one surface of the circuit board. The side walls enclose side edges of the circuit board. The at least one elastic member may be placed between the back surface of the circuit board and the bottom of the case.

In the electric work machine, the at least one elastic member may be an adhesive agent or a sponge.

The electric work machine may be a blower. In use of the blower, a motor is often continuously driven for a long period of time and thus, a temperature of a circuit board is prone to increase due to the motor being driven. Therefore, it is preferred to apply the electric work machine of the present disclosure to the blower.

EXPLANATION OF REFERENCE NUMERALS

1 . . . electric work machine, 11 . . . motor, 31 . . . circuit board, 32 . . . case, 35 . . . adhesive agent, 36 . . . filler, 37, 38 . . . sponge, 41 . . . FET chip, 51 . . . thermal coupling part

MODE FOR CARRYING OUT THE INVENTION

First Embodiment

Hereinafter, a first embodiment of the present disclosure will be described by way of example with reference to the drawings.

Figure 1:
FIG. 1 is a perspective view of an electric work machine.

As illustrated in FIG. 1, there is provided in the present embodiment an electric work machine 1 that is a blower to be used for blowing waste and dust.

The electric work machine 1 includes a main body 2 and a pipe 3. The main body 2 includes a built-in fan, which is not shown, to be rotated for delivering the air. The pipe 3 discharges the air delivered by the main body 2 through a discharge port 3a formed at a leading end of the pipe 3.

In an upper part of the main body 2, there is provided a handle 4 to be gripped by a user of the electric work machine 1. When a front direction of the main body 2 is defined to be a direction to which the pipe 3 protrudes from the main body 2, the handle 4 extends in the upper part of the main body 2 from a front to a rear of the main body 2 so as to define a space to grip the electric work machine 1 between the handle 4 and the main body 2.

The handle 4 is provided with a trigger switch 5. The user of the electric work machine 1 can perform a pulling operation and a releasing operation to the trigger switch 5 while gripping the handle 4. The main body 2 includes a rear end to which two battery packs 6 are detachably attached.

Upon the trigger switch 5 being pulled with the two battery packs 6 attached to the main body 2, the fan inside the main body 2 rotates and the air is discharged through the discharge port 3a.

Figure 2:
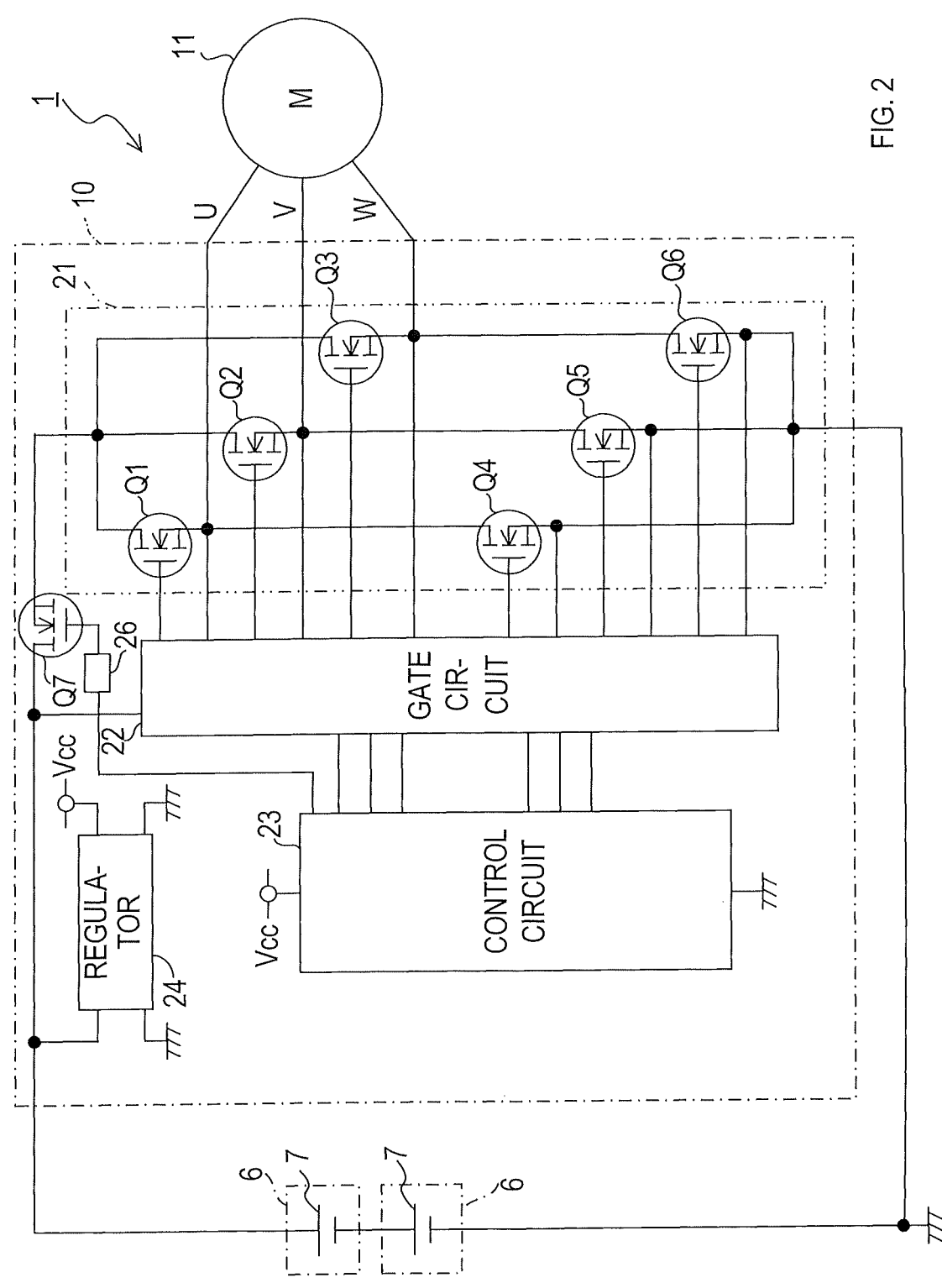
FIG. 2 is a block diagram illustrating an electrical configuration of the electric work machine.

As shown in FIG. 2, the electric work machine 1 includes a control unit 10.

The control unit 10 receives an electric power from batteries 7 inside the battery packs 6 to drive and control a motor 11 for rotating the fan. In the present embodiment, the motor 11 is a three-phase brushless motor. The batteries 7 inside the two battery packs 6 are connected in series with one another.

The control unit 10 includes a drive circuit 21, a gate circuit 22, a control circuit 23, and a regulator 24.

The drive circuit 21 is a circuit for receiving the electric power from the batteries 7 to deliver an electric current to respective windings of phases of the motor 11. The drive circuit 21 in the present embodiment is configured as a three-phase full-bridge circuit including six switching elements Q1, Q2, Q3, Q4, Q5, and Q6. The switching elements Q1 through Q6 in the present embodiment are MOSFETs.

In the drive circuit 21, the switching elements Q1 through Q3 are provided between respective terminals U, V, and W of the motor 11 and a power-supply line coupled to positive-electrode sides of the batteries 7. The switching elements Q4 through Q6 are provided between the respective terminals U, V, and W of the motor 11 and a ground line coupled to negative-electrode sides of the batteries 7.

The gate circuit 22 is a circuit to turn on or off the switching elements Q1 through Q6 of the drive circuit 21 in accordance with a control signal output from the control circuit 23, to thereby deliver the electric current to the respective windings of the phases of the motor 11 and rotate the motor 11.

The control circuit 23 includes a microcomputer including a CPU, a ROM, a RAM, and so on. Various functions of the microcomputer are achieved with the CPU executing a program stored in a non-transitory tangible recording medium. In this example, the ROM corresponds to the non-transitory tangible recording medium storing the program. With an execution of this program, a method(s) corresponding to the program is/are performed. Some of or the entirety of the functions to be performed by the CPU may be implemented on a hardware(s), such as one or more IC(s). The control circuit 23 may include two or more microcomputers.

The regulator 24 receives the electric power from the batteries 7, to thereby generate a power supply voltage Vcc for operating the control circuit 23 and supply the electric power to internal circuits of the control unit 10.

The control unit 10 further includes a switching element Q7 and a bootstrap 26. The switching element Q7 is provided on the power-supply line described above between the batteries 7 and the drive circuit 21. In the embodiment, the switching element Q7 is a MOSFET. The switching element Q7 includes a gate coupled to the control circuit 23 via the bootstrap 26. The switching element Q7 is an element provided so as to protect the control unit 10, and normally remains in an ON-state.

Figure 3:
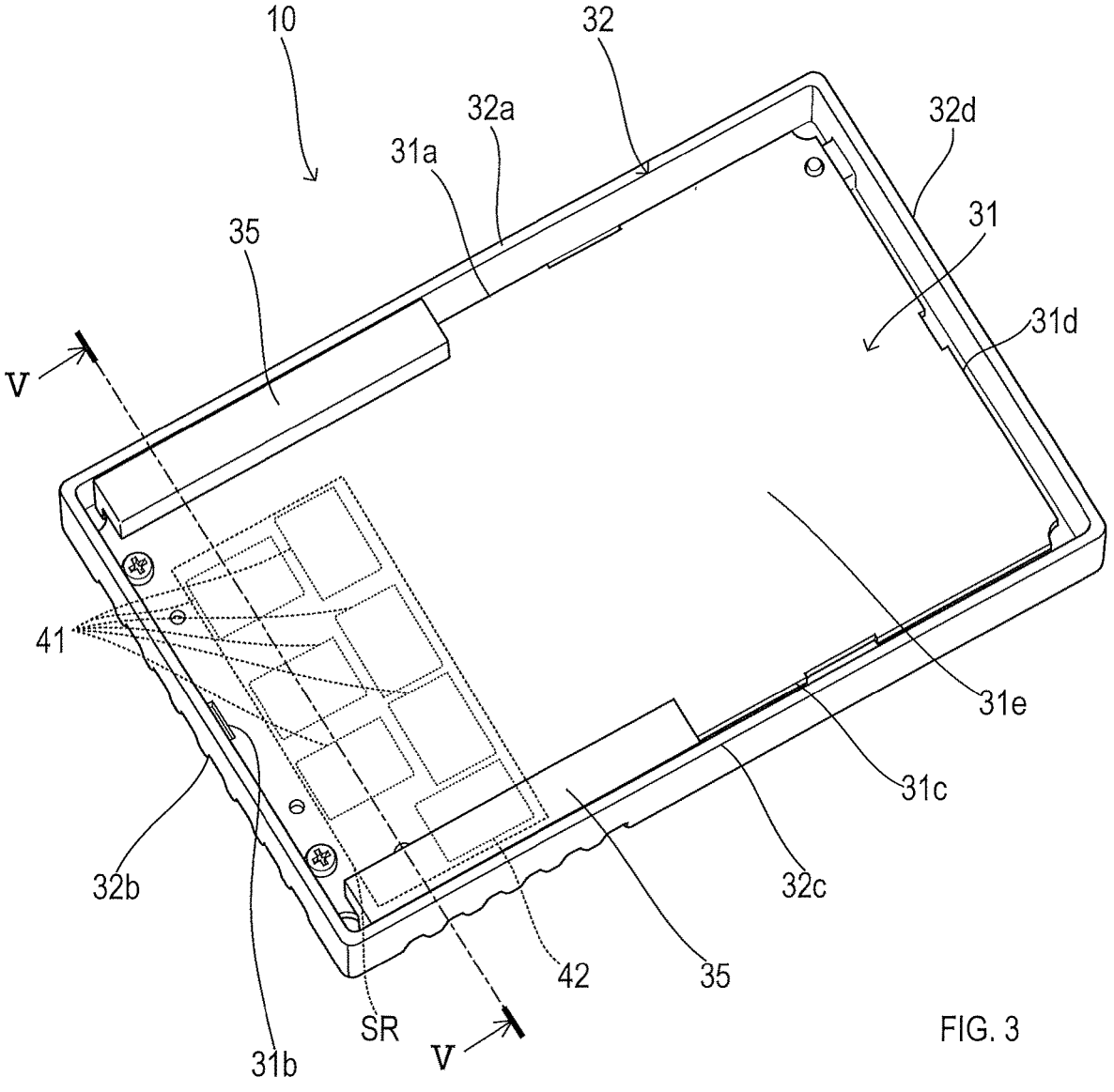
FIG. 3 is a perspective view of a control unit in a first embodiment.

As illustrated in FIG. 3, the control unit 10 includes a circuit board 31 and a metal case 32 housing the circuit board 31 therein. The circuit board 31 includes thereon the drive circuit 21, the gate circuit 22, the control circuit 23, and the regulator 24. In the present embodiment, the case 32 is made of aluminum. The case 32 may be made of metal such as iron, copper, or the like.

Figure 4:
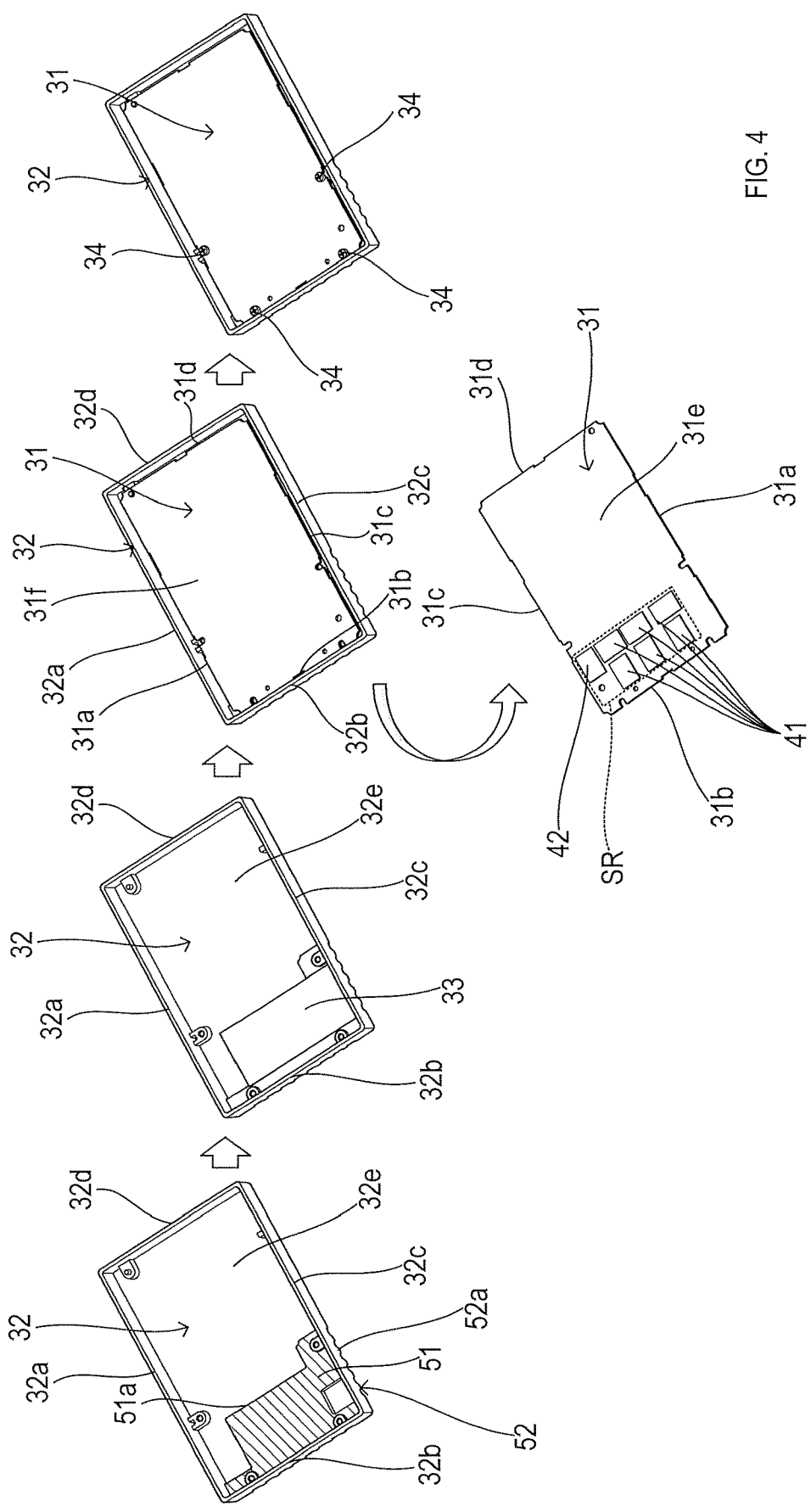
FIG. 4 is a diagram illustrating a procedure for assembling the control unit in the first embodiment.

As illustrated in FIG. 4, the circuit board 31 is formed in a shape of a substantially rectangle with four side edges 31a, 31b, 31c, and 31d. Among the side edges 31a through 31d of the circuit board 31, the side edges 31a and 31c correspond to longer sides of the rectangle, and the side edges 31b and 31d correspond to shorter sides of the rectangle.

In a switching element arrangement area SR defined on a back surface 31e of the circuit board 31 in the vicinity of the side edge 31b, six FET chips 41 and one FET chip 42 are mounted. The six FET chips 41 configures the respective switching elements Q1 through Q6. The one FET chip 42 configures the switching element Q7.

The case 32 includes side walls 32a, 32b, 32c, and 32d to cover the respective side edges 31a, 31b, 31c, and 31d of the circuit board 31 when the circuit board 31 is housed in the case 32. The case 32 includes a bottom 32e to face the back surface 31e of the circuit board 31 when the circuit board 31 is housed in the case 32. The side wall 32a is an outward side wall for the side edge 31a; the side wall 32b is an outward side wall for the side edge 31b; the side wall 32c is an outward side wall for the side edge 31c; and the side wall 32d is an outward side wall for the side edge 31d.

On the bottom 32e of the case 32, there is provided an area with a thermal coupling part 51 to face the switching element arrangement area SR of the circuit board 31 when the circuit board 31 is housed in the case 32. The thermal coupling part 51 is thermally conductive with the FET chips 41 and 42 in the switching element arrangement area SR. A part hatched with oblique lines in FIG. 4 is the thermal coupling part 51.

The bottom part 32e includes a surface forming the thermal coupling part 51 that is raised from a surface forming the bottom part 32e other than the thermal coupling part 51. That is, there is formed a border line 51a between the thermal coupling part 51 and the rest, and the border line 51a has a height difference that makes the thermal coupling part 51 raised.

In the thermal coupling part 51 of the case 32, there is provided a heat dissipation fin 52 on a surface of the case 32 in the reverse side of the surface that is to face the circuit board 31 when the circuit board 31 is housed in the case 32. The heat dissipation fin 52 includes two or more projections 52a projecting from the surface in the reverse side of the surface that is to face the circuit board 31.

Furthermore, the control unit 10 includes a thermally conductive insulation sheet 33. The thermally conductive insulation sheet 33 is in the form of a thin film made from a material (for example, silicone) having a high electrical insulation property and a high thermal conductivity. The thermally conductive insulation sheet 33 is arranged on and in contact with the thermal coupling part 51.

The circuit board 31 is housed in the case 32 such that the back surface 31e thereof faces the bottom 32e of the case 32. The circuit board 31 is then fixed inside the case 32 with two or more screws 34. Consequently, the FET chips 41 and 42 are fixed inside the case 32 and in contact with the thermally conductive insulation sheet 33. Accordingly, the FET chips 41 and 42 are placed in a state of being thermally coupled to the thermal coupling part 51 via the thermally conductive insulation sheet 33.

As illustrated in FIG. 3, the control unit 10 includes adhesive agents 35. The adhesive agents 35 in the present embodiment are KE-4890-W manufactured by Shin-Etsu Chemical Co., Ltd. Examples of the adhesive agents 35 include a thermoplastic resin-based adhesive agent and an elastomeric adhesive agent.

Figure 5:
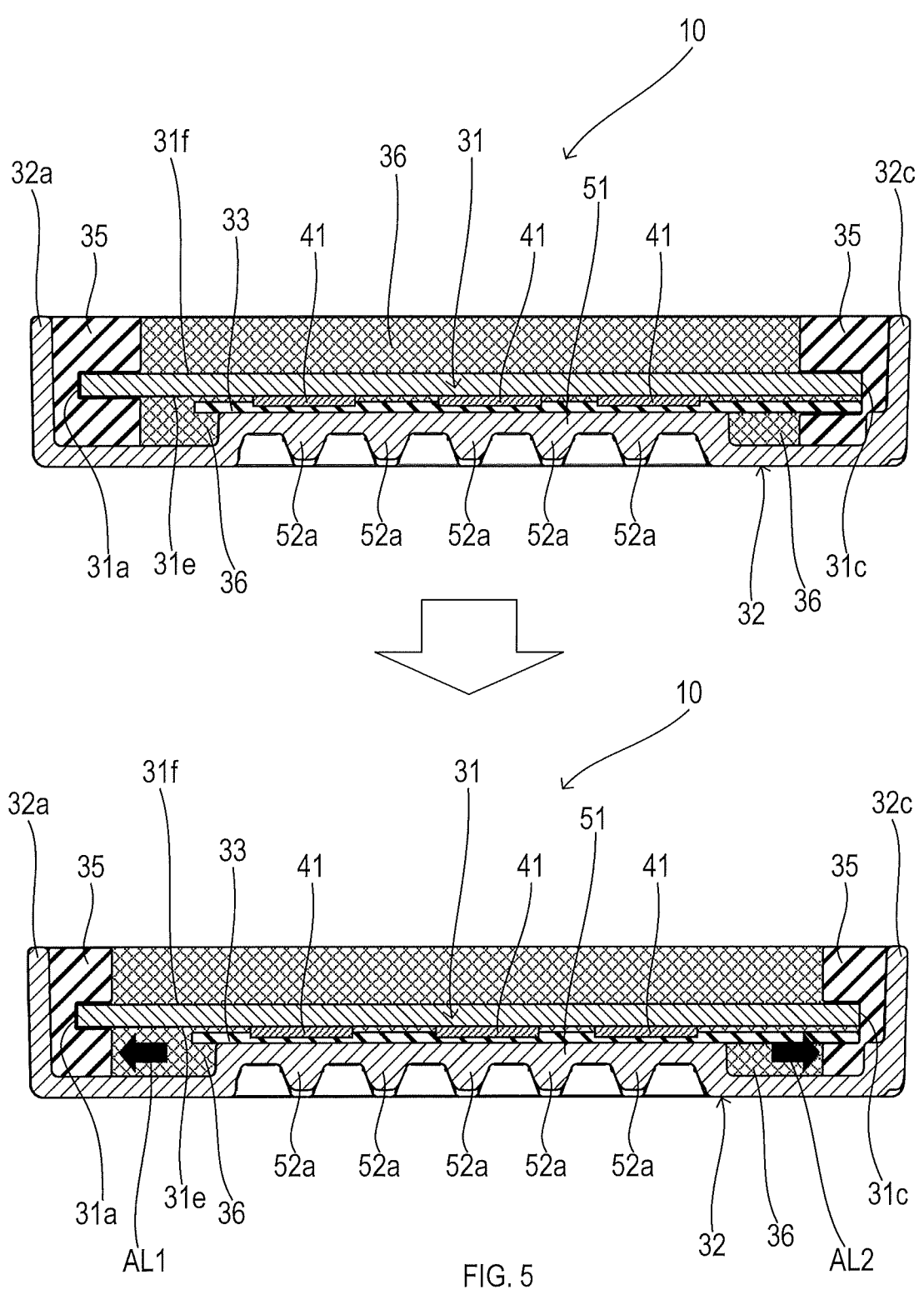
FIG. 5 is a sectional view of the control unit in the first embodiment.

As illustrated in FIGS. 3 and 5, the adhesive agents 35 are filled in a gap between the side edge 31a of the circuit board 31 and the side wall 32a of the case 32 and a gap between the side edge 31c of the circuit board 31 and the side wall 32c of the case 32 so as to interpose therebetween the FET chips 41 and 42 in the switching element arrangement area SR.

Subsequent to filling of the adhesive agents 35, as illustrated in FIG. 5, a filler 36 is filled in the case 32 so as to fill a gap between the back surface 31e of the circuit board 31 and the bottom 32e of the case 32 and cover a front surface 31f of the circuit board 31. The filler 36 in the present embodiment is urethane resin.

The electric work machine 1 configured as above includes the motor 11, the circuit board 31, the case 32, the adhesive agents 35, and the filler 36.

The circuit board 31 includes thereon the FET chips 41 that generate heat due to the motor 11 being driven. The case 32 includes the thermal coupling part 51, which is made of metal and thermally coupled to the FET chips 41, and houses the circuit board 31 therein. The adhesive agents 35 are housed inside the case 32 and arranged between the circuit board 31 and the case 32. The filler 36 is filled inside the case 32 so as to fix the circuit board 31 and the adhesive agents 35 inside the case 32.

In the electric work machine 1 configured as above, even when heat generated in the FET chips 41 results in a higher temperature of the filler 36 and thus expansion of the filler 36, the adhesive agents 35 provided inside the case 32 deform earlier than the circuit board 31 and absorb an expanding force of the filler 36 as indicated by arrows AL1 and AL2 in FIG. 5. Thus, the electric work machine 1 can suppress a force to be applied to the circuit board 31 resulting from the expansion of the filler 36 and thereby suppress a deformation of the circuit board 31 resulting from the expansion of the filler 36. Accordingly, since the deformation of the circuit board 31 is suppressed, the electric work machine 1 can suppress a resulting decrease in heat dissipation performance provided through thermal coupling between the FET chips 41 and the thermal coupling part 51. Moreover, this can suppress further increase in temperature of the circuit board 31 due to the electric work machine 1 being driven.

Hereinafter, a description is given to a reason why the heat dissipation performance of the control unit 10 decreases due to heat generated in the switching elements Q1 through Q6 (that is, the FET chips 41).

Driving the motor 11 by turning on or off the switching elements Q1 through Q6 generates heat in the switching elements Q1 through Q6, which are in the form of the MOSFETs.

Figure 6:
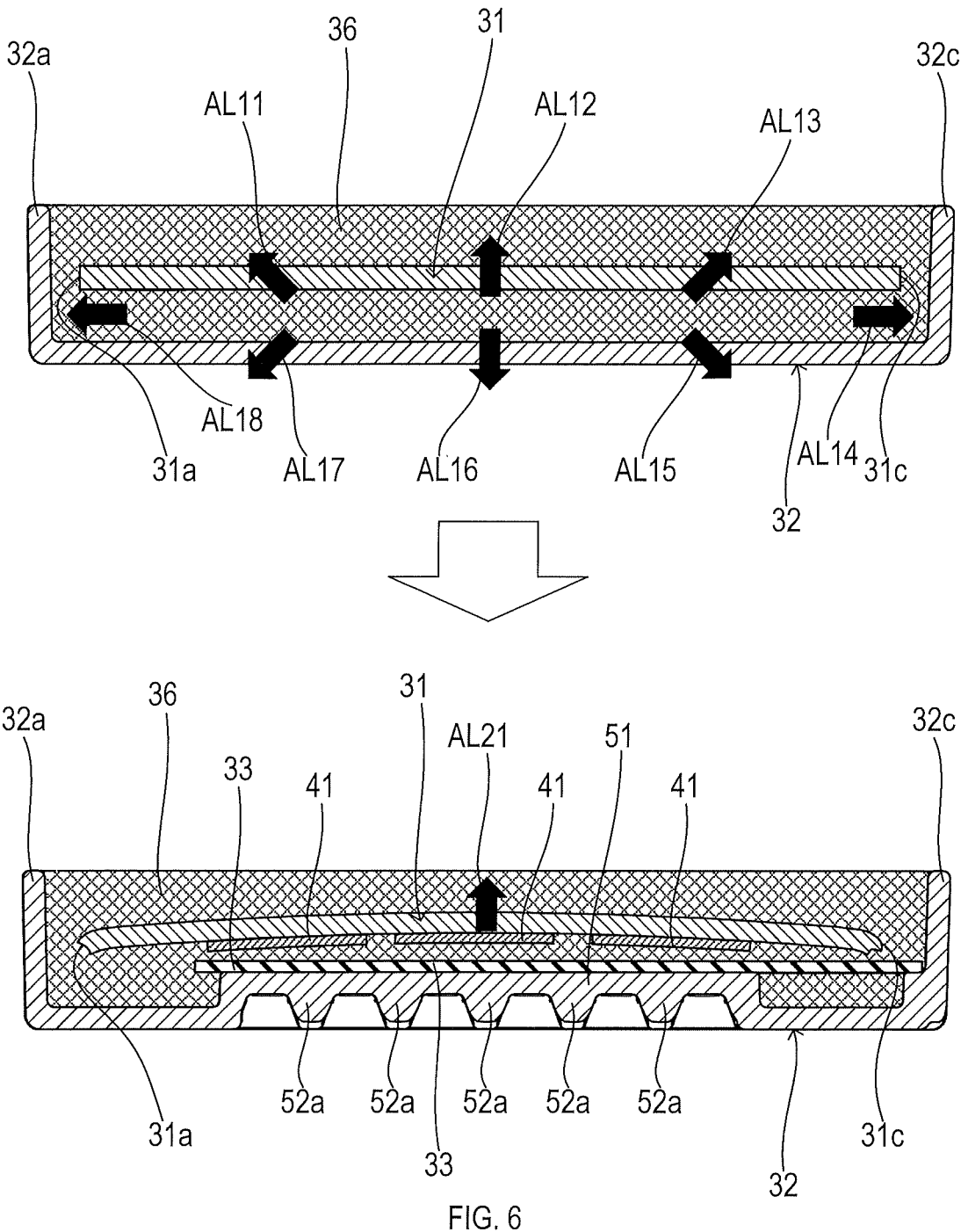
FIG. 6 is a diagram explaining a cause of a deformation of a circuit board.

When the switching elements Q1 through Q6 have a higher temperature due to their heat generation, the filler 36 expands. As illustrated in FIG. 6, the filler 36 filled in a gap between the case 32 and the circuit board 31 has a periphery and a bottom surface covered by the case 32; and has a top surface covered by the circuit board 31. Thus, the filler 36 applies a stress to the circuit board 31 and the case 32 as indicated by the arrows AL11, AL12, AL13, AL14, AL15, AL16, AL17, and AL18 in FIG. 6.

Since a strength of the circuit board 31 is weaker than that of the case 32, the circuit board 31 yields to expansion of the filler 36 (that is, the stress) and deforms. Then, as indicated by the arrow AL21 in FIG. 6, the FET chips 41 mounted on the circuit board 31 are peeled off the thermally conductive insulation sheet 33. This interrupts a heat dissipation path for dissipation of heat generated in the FET chips 41.

Subsequently, upon the control unit 10 being cooled down, the filler 36 returns back to its original shape. However, the circuit board 31 remains deformed without returning to its original shape and thus, the heat dissipation path remains interrupted. Therefore, the heat dissipation performance of the control unit 10 does not recover even when the control unit 10 is cooled down.

The case 32 includes the bottom 32e facing the back surface 31e of the circuit board 31, and the side walls 32a, 32b, 32c, and 32d enclosing the respective side edges 31a, 31b, 31c, and 31d of the circuit board 31. The adhesive agents 35 are placed in the vicinity of the FET chips 41 so as to fill the gap between the side edge 31a of the circuit board 31 and the side wall 32a of the case 32 and the gap between the side edge 31c of the circuit board 31 and the side wall 32c of the case 32. Consequently, the electric work machine 1 can suppress the deformation of the circuit board 31 in the vicinity of the FET chips 41. Since the deformation of the circuit board 31 can be suppressed, the electric work machine 1 can suppress the resulting decrease in heat dissipation performance provided through thermal coupling between the FET chips 41 and the thermal coupling part 51. Moreover, this can suppress further increase in temperature of the circuit board 31 due to the electric work machine 1 being driven.

The circuit board 31 is formed in a shape of a rectangle and includes the four side edges 31a, 31b, 31c, and 31d forming the rectangle. The adhesive agent 35 placed between the side edge 31a of the circuit board 31 and the side wall 32a of the case 32 and the adhesive agent 35 placed between the side edge 31c of the circuit board 31 and the side wall 32c of the case 32 are arranged so as to face each other. The FET chips 41 are arranged between the adhesive agent 35 placed between the side edge 31a of the circuit board 31 and the side wall 32a of the case 32 and the adhesive agent 35 placed between the side edge 31c of the circuit board 31 and the side wall 32c of the case 32.

Consequently, the electric work machine 1 can suppress the deformation of the circuit board 31 at two positions in the vicinity of the FET chips 41. Since the deformation of the circuit board 31 can be suppressed, the electric work machine 1 can suppress the resulting decrease in heat dissipation performance provided through thermal coupling between the FET chips 41 and the thermal coupling part 51. Moreover, this can suppress further increase in temperature of the circuit board 31 due to the electric work machine 1 being driven.

Furthermore, the adhesive agents 35 are also placed closer to the bottom 32e with respect to the front surface 31f of the circuit board 31. Thus, according to the electric work machine 1, expansion of the filler 36 situated between the circuit board 31 and the bottom 32e of the case 32 cannot easily cause the circuit board 31 to deform in a direction away from the thermal coupling part 51. Since the deformation of the circuit board 31 can be suppressed, the electric work machine 1 can suppress the resulting decrease in heat dissipation performance provided through thermal coupling between the FET chips 41 and the thermal coupling part 51.

Moreover, this can suppress further increase in temperature of the circuit board 31 due to the electric work machine 1 being driven.

In the embodiment described above, the thermal coupling part 51 corresponds to one example of the heat dissipation part. The adhesive agents 35 correspond to one example of the elastic member in the present disclosure. The FET chips 41 each correspond to one example of the heat generating element in the present disclosure.

The side edge 31a corresponds to one example of the first side edge in the present disclosure, and the side edge 31c corresponds to one example of the second side edge in the present disclosure.

The adhesive agent 35 placed between the side edge 31a of the circuit board 31 and the side wall 32a of the case 32 corresponds to one example of the first elastic member in the present disclosure. The adhesive agent 35 placed between the side edge 31c of the circuit board 31 and the side wall 32c of the case 32 corresponds to one example of the second elastic member in the present disclosure.

Second Embodiment

Hereinafter, a description is given to a second embodiment of the present disclosure with reference to the drawings. The description is given to a part of the second embodiment that is distinctive from the first embodiment. The same configuration(s) is/are denoted with the same sign (s).

Figure 7:
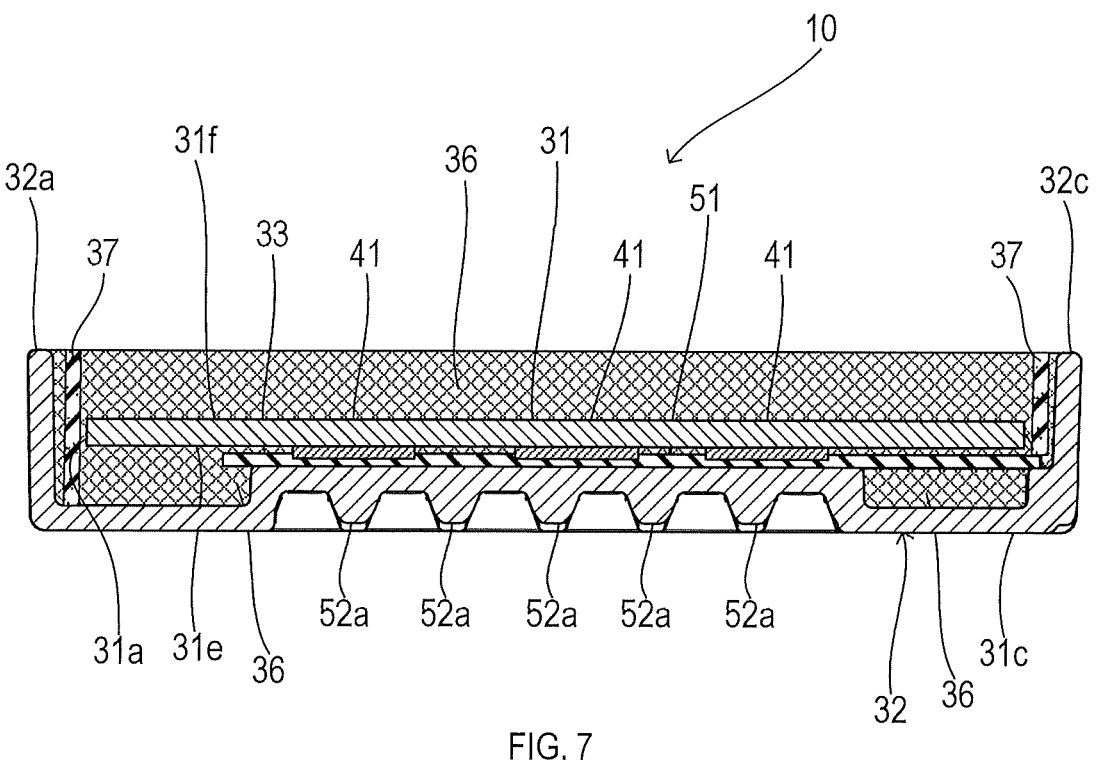
FIG. 7 is a sectional view of a control unit in a second embodiment.

As illustrated in FIG. 7, the electric work machine 1 of the second embodiment is distinctive from that of the first embodiment in that sponges 37 are provided in place of the adhesive agents 35. Examples of the sponges 37 include polyurethane-based sponges, foamed rubber-based sponges, silicon-based sponges, and polyethylene-based sponges.

The sponges 37 are arranged between the side edge 31a of the circuit board 31 and the side wall 32a of the case 32, and between the side edge 31c of the circuit board 31 and the side wall 32c of the case 32 so as to interpose therebetween the FET chips 41 and 42 in the switching element arrangement area SR.

The filler 36 is filled in a gap between the side edge 31a of the circuit board 31 and one sponge 37 and a gap between the side wall 32a of the case 32 and the one sponge 37. Similarly, the filler 36 is filled in a gap between the side edge 31c of the circuit board 31 and the other sponge 37 and a gap between the side wall 32c of the case 32 and the other sponge 37.

The electric work machine 1 configured as above includes the motor 11, the circuit board 31, the case 32, the sponges 37, and the filler 36.

The sponges 37 are placed between the side edge 31a of the circuit board 31 and the side wall 32a of the case 32, and between the side edge 31c of the circuit board 31 and the side wall 32c of the case 32. The filler 36 is filled in between the one sponge 37 and the side wall 32a of the case 32, between the other sponge 37 and the side wall 32c of the case 32, between the one sponge 37 and the side edge 31a of the circuit board 31, and between the other sponge 37 and the side edge 31c of the circuit board 31.

In the electric work machine 1 configured as above, even when heat generated in the FET chips 41 results in a higher temperature of the filler 36 and thus expansion of the filler 36, the sponges 37 placed inside the case 32 deform earlier than the circuit board 31, absorbing the expanding force of the filler 36. Thus, the electric work machine 1 can suppress a force to be applied to the circuit board 31 resulting from the expansion of the filler 36 and thereby suppress a deformation of the circuit board 31 resulting from the expansion of the filler 36. Accordingly, since the deformation of the circuit board 31 is suppressed, the electric work machine 1 can suppress a resulting decrease in heat dissipation performance provided through thermal coupling between the FET chips 41 and the thermal coupling part 51. Moreover, this can suppress further increase in temperature of the circuit board 31 due to the electric work machine 1 being driven.

In the embodiment described above, the sponges 37 correspond to one example of the elastic member in the present disclosure.

Third Embodiment

Hereinafter, a description is given to a third embodiment of the present disclosure with reference to the drawings. The description is given to a part of the third embodiment that is distinctive from the first embodiment. The same configuration(s) is/are denoted with the same sign(s).

Figure 8:
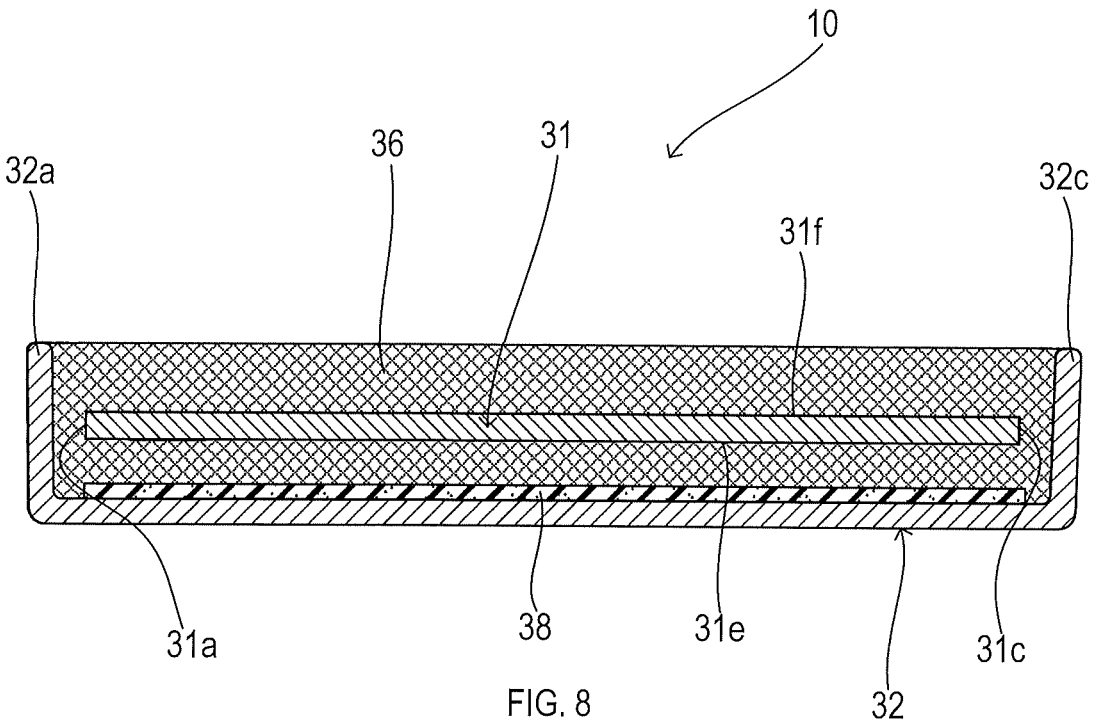
FIG. 8 is a sectional view of a control unit in a third embodiment.

As illustrated in FIG. 8, the electric work machine 1 of the third embodiment is distinctive from that of the first embodiment in that a sponge 38 is provided in place of the adhesive agents 35.

The sponge 38 is arranged between the circuit board 31 and the bottom 32e of the case 32 so as to face an area on the back surface 31e of the circuit board 31 other than the switching element arrangement area SR.

The electric work machine 1 configured as above includes the motor 11, the circuit board 31, the case 32, the sponge 38, and the filler 36.

The sponge 38 is placed between the back surface 31e of the circuit board 31 and the bottom 32e of the case 32.

In the electric work machine 1 configured as above, even when heat generated in the FET chips 41 results in a higher temperature of the filler 36 and thus expansion of the filler 36, the sponge 38 placed inside the case 32 deforms earlier than the circuit board 31, absorbing an expanding force of the filler 36. Thus, the electric work machine 1 can suppress a force to be applied to the circuit board 31 resulting from the expansion of the filler 36 and thereby suppress a deformation of the circuit board 31 resulting from the expansion of the filler 36. Accordingly, since the deformation of the circuit board 31 is suppressed, the electric work machine 1 can suppress a resulting decrease in heat dissipation performance provided through thermal coupling between the FET chips 41 and the thermal coupling part 51. Moreover, this can suppress further increase in temperature of the circuit board 31 due to the electric work machine 1 being driven.

In the embodiment described above, the sponge 38 corresponds to one example of the elastic member in the present disclosure.

Although one embodiment of the present disclosure has been described hereinabove, the present disclosure is not limited by the embodiments described above and can be variously practiced.

For example, the embodiments described above show an aspect in which the case 32 is made of aluminum. However, as long as the thermal coupling part 51 is made of/from a heat dissipation material, a part of the case 32 other than the thermal coupling part 52 may be made of/from a different material (for example, resin).

The embodiments described above show an aspect in which the elastic member is an adhesive agent or a sponge. However, the elastic member may be a sealing material (for example, a silicon-based material) or a heat dissipation sheet (for example, a silicon-based sheet or an acrylic sheet).

The embodiments described above show an aspect in which the FET chips 41 and 42 are thermally coupled with the thermal coupling part 51. However, an IC chip including a heat generating element may be thermally coupled.

The technique in the present disclosure may be applied to various electric work machines, such as an electric hammer, an electric hammer drill, an electric drill, an electric screwdriver, an electric wrench, an electric grinder, an electric circular saw, an electric reciprocating saw, an electric jigsaw, an electric cutter, an electric chainsaw, an electric planer, an electric nail gun (including a riveting machine), an electric hedge trimmer, an electric lawn mower, an electric lawn trimmer, an electric bush/grass cutter, an electric cleaner, an electric blower, an electric sprayer, an electric spreader, and an electric dust collector.

Two or more functions of a single element in the above-described embodiments may be performed by two or more elements, and a single function of a single element may be performed by two or more elements. Two or more functions of two or more elements may be performed by a single element, and a single function performed by two or more elements may be performed by a single element. A part of a configuration in the above-described embodiments may be omitted. At least a part of a configuration in the above-described embodiments may be added to or replaced with another configuration in the above-described embodiments.

The invention claimed is:

1. An electric work machine comprising:

a motor;

a circuit board including an electric/electronic component thereon, the electric/electronic component being configured to generate heat due to the motor being driven;

a case (i) including a heat dissipation part and (ii) housing the circuit board therein, the heat dissipation part being (i) thermally coupled to the electric/electronic component and (ii) configured to dissipate the heat generated in the electric/electronic component;

at least one elastic member (i) between the circuit board and the case and (ii) including an adhesive agent or sponge; and a filler (i) filled in the case and (ii) that fixes the circuit board and the at least one elastic member to the case.

2. The electric work machine according to claim 1, wherein:

the circuit board includes at least one side edge;

the case includes at least one side wall covering the at least one side edge; and the at least one elastic member fills a gap between the at least one side edge and the at least one side wall.

3. The electric work machine according to claim 2, wherein:

the circuit board includes:

a first surface; and a second surface corresponding to a reverse side of the first surface; and the case includes an inner surface facing the second surface.

4. The electric work machine according to claim 2, wherein the at least one elastic member is in a vicinity of the electric/electronic component.

5. The electric work machine according to claim 1, wherein the electric work machine is a blower.

6. The electric work machine according to claim 1, wherein:

the case has a longitudinal direction; and the heat dissipation part is located at one end of the case in the longitudinal direction.

7. The electric work machine according to claim 1, wherein:

the circuit board includes:

a first area including the electric/electronic component; and a second area not including the electric/electronic component; and the at least one elastic member faces the second area.

8. An electric work machine comprising:

a motor;

a circuit board including an electric/electronic component thereon, the electric/electronic component being configured to generate heat due to the motor being driven;

a case (i) including a heat dissipation part and (ii) housing the circuit board therein, the heat dissipation part being (i) thermally coupled to the electric/electronic component and (ii) configured to dissipate the heat generated in the electric/electronic component;

at least one elastic member between the circuit board and the case; and a filler (i) filled in the case and (ii) that fixes the circuit board and the at least one elastic member to the case, wherein:

the circuit board (i) has a shape of a rectangle and (ii) includes first through fourth side edges forming the rectangle, the first side edge being opposed to the second side edge;

the case includes first and second side walls;

the at least one elastic member includes:

a first elastic member between the first side edge and the first side wall; and a second elastic member (i) between the second side edge and the second side wall and (ii) opposed to the first elastic member; and the electric/electronic component is between the first elastic member and the second elastic member.

9. An electric work machine comprising:

a motor;

a circuit board including an electric/electronic component thereon, the electric/electronic component being configured to generate heat due to the motor being driven;

a case (i) including a heat dissipation part and (ii) housing the circuit board therein, the heat dissipation part being (i) thermally coupled to the electric/electronic component and (ii) configured to dissipate the heat generated in the electric/electronic component;

at least one elastic member between the circuit board and the case; and a filler (i) filled in the case and (ii) that fixes the circuit board and the at least one elastic member to the case, wherein:

the circuit board includes:

at least one side edge;

a first surface; and a second surface corresponding to a reverse side of the first surface;

the case includes:

at least one side wall covering the at least one side edge; and an inner surface facing the second surface; and the at least one elastic member (i) fills a gap between the at least one side edge and the at least one side wall and (ii) is closer to the inner surface with respect to the first surface.

10. An electric work machine comprising:

a motor;

a circuit board including an electric/electronic component thereon, the electric/electronic component being configured to generate heat due to the motor being driven;

a case (i) including a heat dissipation part and (ii) housing the circuit board therein, the heat dissipation part being (i) thermally coupled to the electric/electronic component and (ii) configured to dissipate the heat generated in the electric/electronic component;

at least one elastic member between the circuit board and the case; and a filler (i) filled in the case and (ii) that fixes the circuit board and the at least one elastic member to the case, wherein:

the circuit board includes at least one side edge;

the case includes at least one side wall covering the at least one side edge;

the at least one elastic member is between the at least one side edge and the at least one side wall; and the filler is (i) between the at least one elastic member and the at least one side wall and/or (ii) between the at least one elastic member and the at least one side edge.

11. The electric work machine according to claim 10, wherein:

the circuit board includes:

a first surface; and a second surface corresponding to a reverse side of the first surface; and the case includes an inner surface facing the second surface.

12. An electric working machine comprising:

a motor;

a circuit board including an electric/electronic component thereon, the electric/electronic component being configured to generate heat due to the motor being driven;

a case (i) including a heat dissipation part and (ii) housing the circuit board therein, the heat dissipation part being (i) thermally coupled to the electric/electronic component and (ii) configured to dissipate the heat generated in the electric/electronic component;

at least one elastic member between the circuit board and the case; and a filler (i) filled in the case and (ii) that fixes the circuit board and the at least one elastic member to the case, wherein:

the circuit board includes:

a first surface; and a second surface corresponding to a reverse side of the first surface;

the case includes an inner surface facing the second surface; and the at least one elastic member is between the second surface and the inner surface.

13. The electric work machine according to claim 12, wherein:

the circuit board includes at least one side edge; and the case includes at least one side wall covering the at least one side edge.

14. An electric work machine comprising:

a motor;

a circuit board including an electric/electronic component thereon, the electric/electronic component being configured to generate heat due to the motor being driven;

a case (i) including a heat dissipation part and (ii) housing the circuit board therein, the heat dissipation part being (i) thermally coupled to the electric/electronic component and (ii) configured to dissipate the heat generated in the electric/electronic component;

at least one elastic member between the circuit board and the case; and a urethane resin (i) filled in the case and (ii) that fixes the circuit board and the at least one elastic member to the case.

15. The electric work machine according to claim 14, wherein:

the circuit board includes at least one side edge;

the case includes at least one side wall covering the at least one side edge; and the at least one elastic member fills a gap between the at least one side edge and the at least one side wall.

16. The electric work machine according to claim 14, wherein:

the circuit board includes:

a first surface; and a second surface corresponding to a reverse side of the first surface; and the urethane resin is provided on both the first and second surfaces of the circuit board.

17. The electric work machine according to claim 16, wherein:

the case includes an inner surface facing the second surface of the circuit board; and the at least one elastic member is provided between the inner surface of the case and the urethane resin.

* * * * *